Jan. 17, 1967   B. W. TYLER   3,298,286
VALVE OPERATOR
Filed Dec. 18, 1964
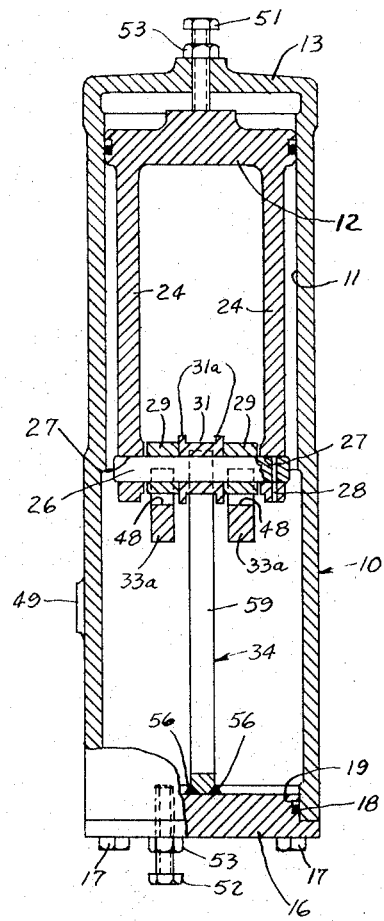
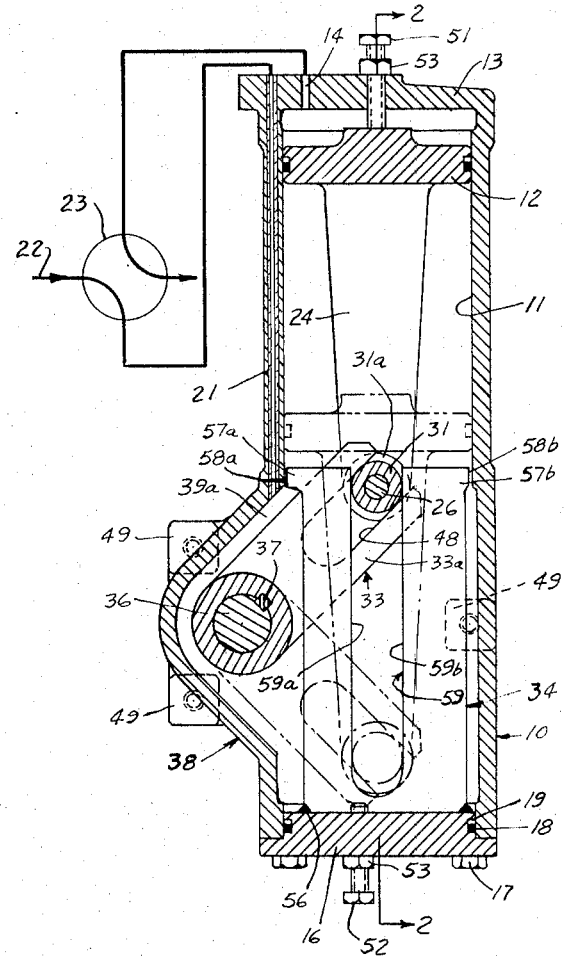
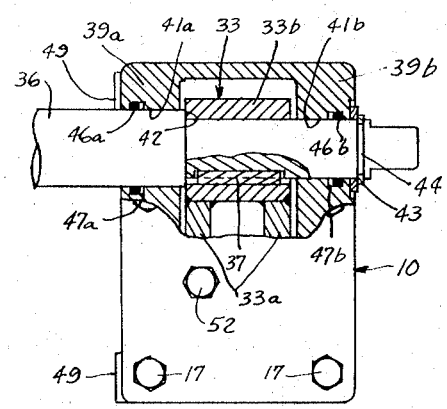
INVENTOR.
BRODY W. TYLER
BY
ATTORNEYS

United States Patent Office 3,298,286
Patented Jan. 17, 1967

3,298,286
VALVE OPERATOR
Brody W. Tyler, Sulphur Springs, Tex., assignor to Grove Valve and Regulator Company, Oakland, Calif., a corporation of California
Filed Dec. 18, 1964, Ser. No. 419,369
12 Claims. (Cl. 92—140)

This invention relates to a valve operating mechanism of the type which converts rectilinear motion of a slide member to a rotary motion for operation of a rotatable valve or the like.

Some valves are operated between open and closed positions by turning the inner valve member approximately 90°. Valves of this type include plug valves, butterfly valves, ball valves and the like. Valve operators for rotating such inner valve members are well known and include, for example, hand operated gear, electric solenoid, pressure operated piston mechanism, and the like. One well known operator includes a rotatable valve operating lever adapted to be coupled to the valve stem and having a bifurcated end engaging a reciprocable slide member. The slide member is movable along an axis which extends transverse to and is radially displaced from the axis of rotation of the valve operating lever so that when the slide member is moved by any suitable source of power, the valve operating lever is caused to pivot through an arc and thereby rotate the valve stem connected thereto. During operation a transverse force is developed on the slide member having a magnitude dependent upon, among other things, the torque on the valve stem. When large torques are required for actuation of the valve, large side loading forces are developed on the reciprocating slide member and sufficiently large bearings are required to withstand such loads.

An object of this invention is the provision of a valve operator for converting rectilinear movement of a slide member into rotary motion of a valve operating lever, which operator includes an inexpensive bearing arrangement for withstanding side loading of the rectilinear slide member upon operation thereof.

An object of this invention is the provision of a rugged yet simple valve operator which is economical to manufacture and assemble.

An object of this invention is the provision of a piston type valve operator which employs a simple and inexpensive bearing arrangement for withstanding side loading of the piston within its cylinder upon operation thereof and is capable of developing large operating torques.

The above and other objects and advantages of the invention are obtained by means of an arrangement which includes a valve operator body in which a slide member is slidably mounted at one end thereof. An arm extends from the slide member and carries a motion transmitting bearing member. A valve operating lever is pivotally mounted on the body, the free end of which lever is bifurcated to receive the motion transmitting bearing member for pivotal movement of the lever upon slide actuation of said slide member. In accordance with this invention a guide plate with an elongated slot formed therein is mounted on the body at the end opposite the slide member. A guide member is mounted on the arm which extends from the slide member, which guide member is received in the elongated slot in the guide plate for movement therealong upon the slide actuation of the slide member. For ease of assembly the guide plate is preferably secured to an end plate removably mounted on the valve operator body at the end opposite the slide member. Most of the transverse or side loading force developed during operation of the device is transmitted from the guide member to the guide plate. The guide plate preferably is formed with lateral bearing extensions at opposite edges thereof which are closely adjacent the inner wall of the body. If the side loading force developed is sufficiently large the guide plate will bend slightly and one of the extensions thereon will engage the inner body wall for transmission of the said side loading force to said body wall.

In the drawings wherein like reference characters refer to the same parts in the several views:

FIG. 1 is a top view in cross section of a valve operator embodying this invention;

FIG. 2 is a cross sectional view taken on line 2—2 of FIG. 1; and

FIG. 3 is an end view of the operator with parts shown broken away for clarity.

Referring to FIGS. 1 and 2 of the drawings, one embodiment of the valve operator of this invention is shown comprising a body or housing designated generally 10 having a cylinder 11 formed at one end thereof. A piston or slide member 12 is slidably carried in the cylinder and is adapted for reciprocating motion therewithin. In the illustrated arrangement the cylinder 11 is formed with an integral head 13 at one end thereof through which a port 14 is formed. The other end of the housing 10 is closed by an end plate or cover 16 secured thereto by screws 17 which extend through holes formed in the cover 16 and engage tapped holes formed in the end of the housing. An O-ring 18 in an annular groove 19 formed in the cover 16 provides a fluid-tight seal between the housing and cover at said other end.

A generally longitudinally extending passageway 21 is formed in the cylinder wall and head and a source of pressure fluid (not shown) is adapted for connection to either end of the cylinder 11 through the port 14 or the passageway 21. The pressure fluid source is connected to the valve operator through a supply line 22 and control valve 23 schematically illustrated in FIG. 1. With the illustrated valve arrangement it will be apparent that when one side of the piston 12 in pressurized through the port 14 the other side thereof is vented through the passageway 21 for slide actuation of the piston toward the inner end of the cylinder. Conversely, when the other side of the piston is pressurized through the passageway 21 in the illustrated position of the valve 23, the one side thereof is vented through the port 14 for slide actuation of the pistons toward the outer end of the cylinder.

A pair of spaced arms extend from the piston 12 toward the end of the housing 10 closed by the cover 16. A pivot pin 26 is carried by the arms 24 within axially aligned holes 27 formed in the free ends of the arms. A dowel pin 28 extending through a hole in one arm 24 and into a hole in the pivot pin 26 locks the pivot pin to the arm.

A pair of spaced motion transmitting rollers or bearings 29 is rotatably carried on the pivot pin 26 between the arms 24. Also, a flanged bearing or guide roller 31 is mounted on the pivot pin 26 between the rollers 29. The rollers 29 provide for a rotatable connection between the pivot pin 26 and lever arms 33a of a valve operating lever 33, whereas the guide roller 31 being rotatable on the pivot pin 26, rolls along a guide plate 34. The guide roller 31 and associated guide plate 34 from an important part of this invention and are described in greater detail hereinbelow.

As seen in FIG. 3, the valve operating lever 33 comprises a cylindrical hub portion 33b to which the arms 33a are welded or otherwise secured. The hub 33b is fixed to a shaft or rotary member 36, as by a key 37. As seen in FIG. 1, one side of the body 10 at the end opposite the cylinder head 13 is formed with a bulge or protuberance designated generally 38 having parallel spaced side walls 39a and 39b which are formed with holes 41a and 41b respectively as seen in FIG. 3, within which holes the shaft 36 is rotatably supported. A shoulder 42 on the shaft 36 abuts the operating lever 33 to limit axial movement of the shaft in one direction. The shaft 36 extends through the walls 39a and 39b and a split ring 43 in an annular groove 44 in an outer extending portion of the shaft limits axial movement of the shaft in the other direction. O-rings 46a and 46b in annular grooves 47a and 47b in the walls 39a and 39b provide a sealing engagement between the shaft 36 and body 10.

As best seen in FIG. 1, the free ends of the spaced lever arms 33a for the valve operating lever 33 are slotted or bifurcated as at 48 for engagement with the spaced motion transmitting bearing or roller members 29 carried on the pin 26. As mentioned above, the rollers 29 provide for a rotatable connection between the pins and valve operating lever. The invention, however, is not limited to such rotatable connection. For example, the bearings 29 may be dispensed with and the pivot pin 26 ride directly against the walls of the slot 48. In another alternative construction, the bearings 29 may comprise rectangular blocks rotatably mounted on the pivot pin 26 and slidably engagable with the lever 33 in the slots 48 formed in the arms 33a thereof.

In use as a valve operator, the shaft 36 is connected by means (not shown) to the valve stem of a rotary valve to be controlled and the operator is mounted on the valve or on a suitable supporting structure by use of tapped bosses 49 on the body 10. The valve operator has two end operating positions one of which is shown in full line, and the other in phantom in FIG. 1. Either end operating position may correspond with either a valve open or a valve closed condition, depending upon the valve construction and the mounting position of the valve operator thereon. Adjustable stop members such as cap screws 51 and 52 extend through the cylinder head and end cover 16, respectively, in position to be engaged by the piston 12 and one of the lever arms 33a. Lock nuts 53 on the screws are tightened to fixedly secure the screws at the desired stop position. As mentioned above, the rotary valve to which the operator is attached may comprise a ball, plug, butterfly or the like valve which is rotated 90° between fully opened and fully closed position. The adjustable stop members 51 and 52 provide means for setting the end operating positions of the valve accurately after the operator is installed on the valve. Exact registry of the port in the body of the valve and the rotatable plug or ball in the valve open condition is possible by simply adjusting one of the stop members 51 or 52. Adjustment of the other stop member provides means for setting of the closed position of the valve.

During travel of the piston or slide member 12 from one end operating position to the other upon pressurization of the cylinder, the bearings 29 ride against a side of the slots 48 in the arms 33a, and the only force (neglecting friction) that can be transmitted to the arms is perpendicular to the slots side walls. In an intermediate position of the piston 12, this force is parallel to the axis of the cylinder 11 and as a result there is no side thrust or force on the slide member perpendicular to the cylinder axis at this point. At all other positions of the slide member 12 it will be apparent that a transverse force is developed on the slide member, the magnitude and direction of which depends upon (among other things) the rotary position of the valve operating lever 33 and the direction which the slide member 26 is being driven. Of course, it is to be understood that the slots 48 in the arms of the lever 33 could be angled to reduce the transverse force during opening movement. However, such transverse forces will not be eliminated by such modification.

In accordance with this invention the novel guide roller 31 and plate 34 arrangement mentioned above carry the side thrust or loading forces. As best seen in FIG. 1 the guide plate comprises a generally rectangular shaped member having a width somewhat less than the diameter of the cylinder 11. One end of the guide plate is shown welded to the end plate 16 at 56, and is of sufficient length to extend into the inner end of the cylinder 11 when the end plate 16 is attached to the body as illustrated. Laterally extending ears or bearing extensions 57a and 57b (see FIG. 1) are formed on opposite edges of the guide plate at the free end thereof, and the lateral bearing surfaces 58a and 58b of the extensions are closely adjacent the inner wall of the cylinder 11 for reasons which will become apparent hereinbelow.

An elongated slot 59 is formed in the guide plate and receives the guide roller 31 carried on the pivot pin 26. If desired the roller 31 may be formed with radial flanges 31a at opposite ends thereof for engagement with opposite faces of the guide plate adjacent the slot as best seen in FIG. 2. As mentioned above, the slide member 12 is driven from the solid line position to the broken line position shown in FIG. 1 by pressurization of the cylinder at one side of the slide member through the port 14 and venting of the cylinder at the other side of the slide member through the passageway 21. With the cylinder so pressurized, and with the slide member 12 in the position shown in solid lines in FIG. 1, the guide roller 31 is urged against the side 59a of the slot by such side loading which is large in the position shown in FIG. 1. As the slide member 12 moves along the cylinder, the side force diminishes and reduces to zero when the valve operating lever 33 is normal to the cylinder, that is, its center position. As the slide member moves past the center position the side loading force reverses direction and increases in magnitude, the guide roller 31 then being urged against the side 59b of the slot by such force. It will be apparent therefore that the side loading force between the guide roller 31 and guide plate 34 reduces to zero at the center condition of the operator and reverses direction as the slide member moves past said center position.

To rotate the lever 33 and attached shafts 36 back to the solid line position illustrated in FIGS. 1 and 2 from the broken line position shown in FIG. 1, the control valve 23 is turned to the position illustrated in FIG. 1 for pressurization of the cylinder at the other side of the slide member through the passageway 21 and venting of the one side of the slide member through the port 14. The return operation is similar to that described above except the side loading forces are reversed in direction during return travel of the slide member.

The transverse forces on the guide plate 34 which are transmitted thereto by the guide roll 31 tend to bend the guide plate thereby spreading the same. The amount of spreading of the guide plate is limited however by engagement of the lateral bearing surfaces 58a and 58b with the inner cylinder wall. The spreading effects are generally greatest when the slide member 12 is at the head-end of the cylinder 11 and the guide roller 31 is adjacent the open end of the slot 59 in the guide plate. The amount of bending is limited substantially to the clearance provided between the end surfaces 58a and 58b of the lateral bearing extensions and the inner cylinder wall. With the bearing extensions in engagement with the cylinder wall, the side loading forces are transmitted therethrough to the cylinder wall. The operator is constructed with adequate clearance between the bearing extensions 57a and 57b and the inner cylinder wall to facilitate assembly of the end plate 16, with the attached guide plate, onto the housing 10.

It will be noted that the guide plate 34 is solely supported on the end plate 16. It is a simple matter to accurately position and weld the guide plate to the end plate. The end plate 16 is secured accurately on the end of the housing 10 simply by finishing their interfitting surfaces and by placing the mounting holes through which the screws 17 extend. Obviously, it is a simple matter to accurately form such parts and locate such holes. It will be apparent therefore, that this construction results in a simple easy to assemble precision valve operator.

The invention having been described in detail in accordance with the requirements of the patent statutes, various changes and modifications may be suggested to those skilled in this art. For example, any suitable drive means for moving the slide member 12 may be employed. Instead of a piston actuator as illustrated, a screw-type actuator may be employed in threaded engagement with the slide member. Upon rotation of the screw by means of a motor, crank, wheel or the like, the slide member may be linearly driven. In addition, it is not necessary that the bearing surfaces on the edges of the guide plate extend into the cylinder portion of the body. They may, for example, be closely adjacent other portions of the body such as the wall of a bore slightly larger than the cylinder bore. Similarly, the body could be provided with bearing pads adjacent the end of the cylinder against which the lateral bearing surfaces of the guide plate may abut. Further, it will be readily apparent that the guide plate may be formed without the bearing extensions. For example, bearing surfaces may be formed on the guide plate in substantial alignment with the outer edges of the plate or, if desired, the guide plate may be first formed with straight outer edges and then machined down a desired amount to form recessed bearing surfaces. Other such changes and modifications may be suggested to those skilled in the art without departing from the spirit and scope of this invention as defined by the claims appended hereto.

Having described my invention, I claim:

1. A valve operator comprising:
a housing,
means forming a cylindrical chamber at one end of said housing,
a piston slidably carried in said chamber,
an end plate mounted on said housing at the other end thereof,
a pair of spaced arms extending from said piston toward said other end,
a pair of rollers rotatably mounted between said arms,
a guide roller rotatably mounted between said arms,
a guide plate secured on said end plate to extend toward said one end of said housing,
means forming an elongated slot opening in the free end of said guide plate,
said guide roller being received in said slot,
lateral bearing surfaces on opposite edges of said guide plate at said free end thereof,
surfaces on said housing closely adjacent to said bearing surfaces to limit spreading of said guide plate,
a pair of valve operating levers pivotally mounted in said housing,
means forming a slot in each of said levers to receive one of said pair of rollers, and
means for introducing pressure fluid selectively on opposite sides of said piston.

2. A valve operator comprising:
a housing,
means forming a cylindrical chamber in said housing at one end thereof,
a piston slidably carried in said chamber,
an end plate mounted on said housing at the other end thereof,
a guide member mounted on said piston,
a guide plate secured on said end plate to extend toward said one end of said housing,
means forming an elongated slot opening in the free end of said guide plate,
said guide member being received in said slot for movement therealong,
lateral bearing surfaces on opposite edges of said guide plate at said free end thereof,
stop surfaces in said housing closely adjacent said bearing surfaces to limit spreading of said guide plate,
a valve operating lever pivotally mounted in said housing,
means connecting the free end of said lever to said piston to convert linear movement of said piston into pivotal movement of said lever, and
means for introducing pressure fluid selectively on opposite sides of said piston.

3. A valve operator comprising:
a housing,
means forming a cylinder chamber in said housing at on end thereof,
a piston slidably carried in said chamber,
an end plate mounted on said housing at the other end thereof,
an arm extending from said piston toward said other end,
a motion transmitting bearing member on said arm,
a guide member mounted on said arm,
a guide plate secured on said end plate to extend toward said one end of said housing,
means forming an elongated slot opening in the free end of said guide plate,
said guide member being received in said slot,
lateral bearing surfaces on opposite edges of said guide plate at said free end thereof,
stop surfaces in said housing closely adjacent said bearing surfaces to limit spreading of said guide plate,
a valve operating lever pivotally mounted in said housing,
means forming a slot in said lever to receive said motion transmitting bearing member, and
means for introducing pressure fluid selectively on opposite sides of said piston.

4. A valve operator comprising:
a housing,
means forming a cylindrical chamber in said housing at one end thereof,
a piston slidably carried in said chamber,
a pair of spaced arms extending in one direction from said piston toward the other end of said housing,
a pair of motion transmitting bearing members mounted between said arms,
a guide member mounted between said arms,
a guide plate secured in said housing at the other end thereof,
means forming an elongated slot in said guide plate,
said guide member being received in said slot for movement therealong,
a pair of valve operating levers pivotally mounted in said housing,
means forming a slot in each of said levers to receive one of said pair of bearing members, and
means for introducing pressure fluid selectively on opposite sides of said piston.

5. A valve operator comprising:
a body,
a driven member movable along said body at one end thereof,
an end plate mounted on said body at the other end thereof,
a pair of spaced arms extending from said movable driven member toward said other end,
a pair of rollers rotatably mounted between said arms,
a guide roller rotatably mounted between said arms,
a guide plate secured on said end plate to extend toward said one end of said body,
means forming an elongated slot opening in the free end of said guide plate,
said guide roller being received in said slot, lateral bearing surfaces on opposite edges of said guide plate at the free end thereof,
surfaces on said body closely adjacent to said bearing surfaces to limit spreading of said guide plate,
a pair of valve operating levers pivotally mounted on said body,
means forming a slot in each of said levers to receive one of said pair of rollers, and
means for driving said movable driven member selectively in opposite directions toward and away from said other end.

6. A valve operator comprising:
a body,
a driven member movably carried by said body at one end thereof,
an end plate mounted on said body at the other end thereof,
a pair of spaced arms extending from said driven member toward said other end,
a motion transmitting bearing mounted between said arms,
a guide bearing mounted between said arms,
a guide plate secured on said end plate to extend toward said one end of said body,
means forming an elongated slot opening in the free end of said guide plate,
said guide bearing being received in said slot,
lateral bearing surfaces on opposite edges of said guide plate at the free end thereof,
stop surfaces in said body closely adjacent said bearing surfaces to limit spreading of said guide plate,
a valve operating lever pivotally mounted on said body,
means forming a slot in said lever to receive said motion transmitting bearing, and
means for driving said movable driven member selectively in opposite directions toward and away from said other end.

7. A valve operator comprising:
a body,
a driven member movably carried by said body at one end thereof,
an end plate mounted on said body at the other end thereof,
a guide member mounted on said driven member,
a guide plate secured on said end plate to extend toward said one end of said body,
means forming an elongated slot opening in the free end of said guide plate,
said guide member being received in said slot for movement therealong,
lateral bearing surfaces on opposite edges of said guide plate at said free end thereof,
surfaces on said body closely adjacent to said bearing surfaces to limit spreading of said guide plate,
a valve operating lever pivotally mounted on said body,
means connecting the free end of said lever to said driven member to concert linear movement of said driven member to pivotal movement of said lever, and
means for driving said driven member selectively in opposite directions toward and away said other end.

8. A valve operator comprising:
a body,
a driven member movably carried on said body at one end thereof,
an end plate mounted on said body at the other end thereof,
an arm extending from said driven member toward said other end,
a motion transmitting bearing member on said arm,
a guide member mounted on said arm,
a guide plate secured on said end plate to extend toward said one end of said body,
means forming an elongated slot opening in the free end of said guide plate,
said guide member being received in said slot,
lateral bearing surfaces on opposite edges of said guide plate at the free end thereof,
surfaces on said body closely adjacent said bearing surfaces to limit spreading of said guide plate,
a valve operating lever pivotally mounted on said body,
means forming a slot in said lever to receive said motion transmitting bearing member, and
means for driving said driven member selectively in opposite directions toward and away said other end.

9. A valve operator comprising:
a housing,
means forming a cylindrical chamber in said housing at one end thereof,
a piston of short axial length slidably carried in said chamber,
an arm extending in one direction from said piston toward the other end of said housing,
a motion transmitting bearing member mounted on said arm,
a guide member mounted on said arm at a substantial distance from said piston,
a guide plate secured in said housing at the other end thereof,
means forming an elongated slot in said guide plate,
said guide member being received in said slot for movement therealong,
a valve operating lever pivotally mounted in said housing,
means forming a slot in said lever to receive said motion transmitting bearing member, and
means for introducing pressure fluid selectively on opposite sides of said piston,
lateral thrust of said valve operating lever on said bearing member being transmitted from said bearing member to said guide member and thence to said guide plate,
said guide member having means associated therewith to resist said lateral thrust during operation of said valve operator.

10. A valve operator comprising:
a body,
a rotatable member on said body and adapted to be coupled to a valve stem,
a valve operating lever secured to and extending radially from said rotatable member,
a driven member movably mounted in said body for movement along a lineal path, which driven member is of short length in the direction of said path,
means connecting said valve operating lever to said driven member,
a guide plate fixed on said body to extend in a plane transverse to the axis of said rotatable member,
means forming an elongated slot in said guide plate,
an arm extending in one direction from said driven member,
means on said arm at a substantial distance from said driven member slidable in said slot for movement therealong, and
means for driving said driven member in opposite directions in said body,
said rotatable member being rotated in one direction when said driven member is driven in one direction and in the opposite rotary direction when the driven member is driven in the opposite direction,
lateral thrust of said valve operating lever on said connecting means being transmitted to said slidable means and thence to said guide plate,
said guide plate having means associated therewith to resist said lateral thrust during operation of the valve operator.

11. The valve operator defined by claim 10 including:
means forming a cylinder in one end of said body in which said driven member is slidably mounted, an end plate removably mounted on the body at the end opposite said cylinder, said slotted guide plate being fixedly secured to said end plate.

12. The valve operator defined by claim 10 wherein:

said means associated with said guide plate to resist said lateral thrust comprises lateral bearing surfaces formed on opposite edges of said guide plate which surfaces are closely adjacent portions of said body.

References Cited by the Examiner

UNITED STATES PATENTS

| | | | |
|---|---|---|---|
| 2,865,593 | 12/1958 | Staiger | 251—58 X |
| 3,056,573 | 10/1962 | Matheson et al. | 251—58 X |
| 3,104,592 | 9/1963 | Sheesley | 92—140 X |

MARTIN P. SCHWADRON, *Primary Examiner.*

I. C. COHEN, *Assistant Examiner.*